United States Patent [19]

LeBoeuf

[11] 4,261,875

[45] Apr. 14, 1981

[54] CONTACT LENSES CONTAINING HYDROPHILIC SILICONE POLYMERS

[75] Inventor: Albert R. LeBoeuf, Framingham, Mass.

[73] Assignee: American Optical Corporation, Southbridge, Mass.

[21] Appl. No.: 8,301

[22] Filed: Jan. 31, 1979

[51] Int. Cl.³ .................. C08F 220/28; C08F 230/08; C08F 30/08; C08L 29/02
[52] U.S. Cl. .................. 260/29.7 H; 260/29.1 SB; 260/29.6 TA; 260/29.6 H; 260/29.6 HN; 260/29.2 M; 526/227; 526/264; 526/279; 556/450
[58] Field of Search .................. 526/264, 279; 260/29.7 H, 29.1 SB, 29.6 TA, 29.6 H, 29.6 HN, 29.2 M

[56] References Cited

U.S. PATENT DOCUMENTS

| | | | |
|---|---|---|---|
| 3,655,602 | 4/1972 | Sekmakas | 260/29.2 M |
| 4,136,250 | 1/1979 | Mueller et al. | 528/29 |
| 4,138,382 | 2/1979 | Polmanteer | 260/29.6 TA |
| 4,139,513 | 2/1979 | Tanaka et al. | 526/279 |
| 4,139,692 | 2/1979 | Tanaka et al. | 526/279 |
| 4,153,641 | 5/1979 | Deichert et al. | 526/279 |

OTHER PUBLICATIONS

New Information Product "Silicone Polycarbinols" Dow Corning Corp.

*Primary Examiner*—Joseph L. Schofer
*Assistant Examiner*—Herbert J. Lilling
*Attorney, Agent, or Firm*—Jeremiah J. Duggan; Alan H. Spencer

[57] ABSTRACT

Homopolymers and copolymers of compounds according to the formula;

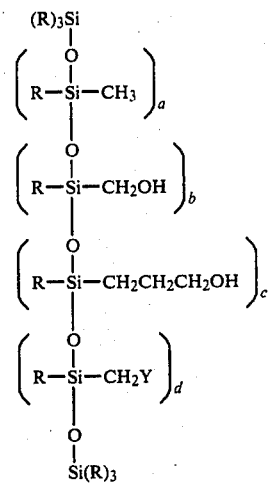

wherein R is an alkyl having 1 to 3 carbons, $a+b+c+d=e$, $b=0$ to $e$, $c=0$ to $e$, $b+c>1$, $d=0$ to 5, $e=1$ to 100, and Y is an organic group containing at least one $>C=C<$ are hydrophilic as well as exhibiting properties similar to silicone compounds. The polymers are particularly useful in contact lenses having enhanced oxygen permeability.

8 Claims, No Drawings

CONTACT LENSES CONTAINING HYDROPHILIC SILICONE POLYMERS

BACKGROUND OF THE INVENTION

Silicone polymers have received considerable attention as potential contact lens materials because of their high oxygen permeability. However, one major obstacle preventing the adoption of silicone polymers for contact lenses has been the hydrophobicity inherent in silicone compounds and polymers. Efforts to treat silicone polymers to produce sufficient surface wetability to be acceptable to the contact lens profession have not been successful. Neither have efforts to copolymerize silicone compounds with conventional contact lens monomers been successful.

PRIOR ART

British Pat. No. 1,480,880 was published July 27, 1977. This patent by Bausch and Lomb, Incorporated is directed to a type of interpolymer containing selected hydrophilic monomers polymerized in the presence of a silicone (hydrophobic) prepolymer and represents the most pertinent prior art. The reaction product contains two entangled networks resulting from the independent polymerization of the hydrophobic prepolymer and the hydrophilic monomers. Hydroxyethylmethacrylate (HEMA) cross-linked with ethylene glycol dimethacrylate (EDMA) is an example of the disclosed hydrophilic monomers and poly(dimethylsiloxane) with 0.2 mole percent vinyl functionality is an example of the disclosed hydrophobic silicone prepolymer. These interpolymers are very difficult, if not impossible, to machine because they are pliable even before hydration.

U.S. Pat. No. 3,808,178 issued Apr. 30, 1974 to Gaylord and discloses hard contact lenses fabricated from a copolymer of a polysiloxanylalkyl acrylic ester and an alkyl acrylic ester. One example of a polysiloxanylalkyl acrylic ester is pentamethyl disiloxanylmethyl methacrylate which has the formula

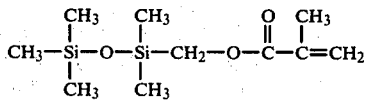

The patent does not suggest or teach the use of hydrophilic groups attached to the siloxane material. The monomers and the siloxanes of the patent remain hydropholic and incompatable with hydrophilic materials such as HEMA in spite of the acrylic terminal groups. While the disclosed contact lenses may have increased oxygen permeability, they are rigid and are incapable of absorbing water.

BRIEF DESCRIPTION OF THE PRESENT INVENTION

Compounds according to the formula

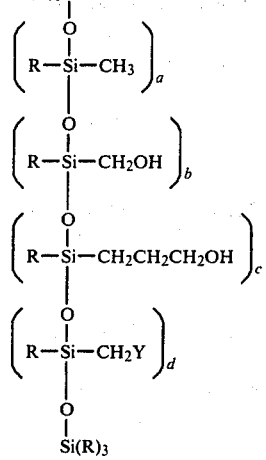

wherein R is an alkyl having 1 to 3 carbons, $a=e-(b+c+d)$, $b=0$ to $e$, $c=0$ to $c$, $b+c>1$, $d=0$ to 5, $e=1$ to 100, and Y is an organic group containing at least one $>C=C<$ are hydrophilic and useful in the preparation of contact lens materials.

The compounds are able to absorb about 5% by weight of water and homopolymers may absorb as much as 20% to 25% water. The compounds may be polymerized with themselves as a homopolymer or copolymer or with monomers such as 2-hydroxyethylmethacrylate (HEMA), 3-methoxy-2-hydroxpropymethacrylate (G-MEMA), methylmethacrylate (MMA), methylacrylate (MA), N-vinylpyrrolidone (NVP) and mixtures thereof.

The hydrophilic nature of the above compounds is particularly advantageous in the contact lens field. Unlike most siloxanes these monomers are compatible with carbon monomers even if they are hydrophilic. Most siloxanes have limited compatibility with hydrophobic carbon contained monomers and are completely compatible with hydrophilic monomers.

Representative member compounds of the present invention include those according to formula I where:

1. $R=CH_3$, $a\&b=0$, $c=33$, $d=2$, $e\sim35$ and Y is

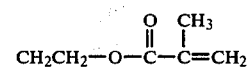

2. $R=CH_3$, $a\&b=0$, $c=30$, $d=5$, $e\sim35$ and Y is

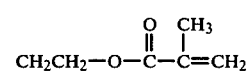

3. $R=CH_3$, $a=23$, $b=0$, $c=10$, $d=2$, $e\sim35$ and Y is

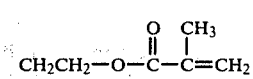

4. $R=CH_3$, $a=20$, $b=10$, $c=3$, $d=2$, $e\sim35$ and Y is

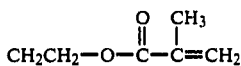

5. R=CH₃, a=0, b=8, c=26, d=1, e∼35 and Y is

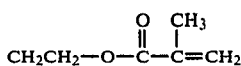

6. R=CH₃, a,b&d=0, c=35 and e∼35
7. R=CH₃, a&c=0, b=9, d=1, e∼10 and Y is

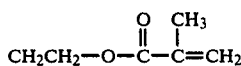

8. R=CH₃, a&c=0, b=79, d=1, e∼80 and Y is

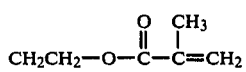

9. R=CH₃, a&b=0, c=19, d=1, e∼20 and Y is

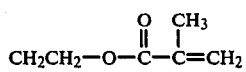

10. R=CH₃, a&c=0, b=19, d=1, e∼20 and Y is

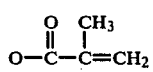

11. R=CH₃, a&b=0, c=19, d=1, e∼20 and Y is

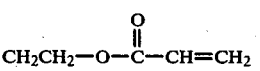

12. R=CH₃, a&b=0, c=19, d=1, e∼20 and Y is CH₂CH₂—O—CH₂CH=CH₂

EXAMPLE I

An isopropanol solution containing 1.35 mg as Pt⁺⁴ of chloroplatinic acid was placed in a reaction flask and the isopropanol removed by vacuum distillation. 20 g. of

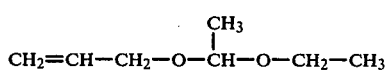

and 20 g. of cyclohexane were introduced into the flask. The contents were maintained at about 60° to 65° C. by heating and agitated while 7 g. of a silane of the formula

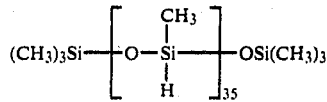

were slowly added over a period of about 35 minutes. After addition of the silane, the temperature was raised to 95° to 100° C. during the next hour and maintained at that temperature until the reaction was completed (about 3½ to 4 hrs). The cyclohexane and unreacted acetyl component were extracted under vacuum. The clear high viscosity residue was refluxed at 70° C. with 100 g. of methanol and 0.2 g. of p-toluene sulfonic acid for 4 hours. After cooling the chloroplatinic acid catalyst and sulfonic acid were neutralized with KOH. One or two drops of glacial acetic acid were added to assure a slightly acidic product.

Evaporation of the volatiles under vacuum gave a 95% yield of

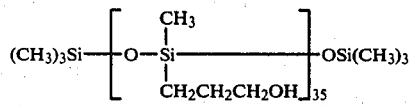

The sulfonic acid salt was removed by dissolving the product in acetone, filtering the solution and then evaporating the acetone.

EXAMPLE II

Using a water cooled reaction vessel maintained below 10° C., 500 g of allyl acetate and 250 g. of 1,3,5,7-tetramethyltetrahydrocyclotetrasiloxane is agitated with 315 g. of cyclohexane. The reaction proceeds vigorously in the presence of 32 mg. Pt⁺⁴ and cooling is required until most of the reaction is completed. After the reaction rate slows, the mixture is heated to 60°–70° C. for 2 to 4 hours to react the remaining starting materials. The mixture is then cooled to room temperature and the volatiles evaporated by vacuum to yield 1,3,5,7-tetra(1-acetoxypropyl)cyclotetramethylsiloxane.

640 g. of tetra(1-acetoxypropyl)cyclotetramethylsiloxane, 35 g. of 1,7-dichlorooctamethyltetrahydrotetrasiloxane, 1.6 g. of FeCl₃ and 2 drops of water are placed in the reaction flask fitted with a reflux condenser. A viscous fluid is produced after heating for 16–24 hours at 80° C. The fluid is diluted with an equal volume of hexane (or toluene), 25 g. of triethylamine is added and then 24 g. of trimethylsilonate (slight excess) is slowly added. After reacting overnight at room temperature and filtering a product of the formula:

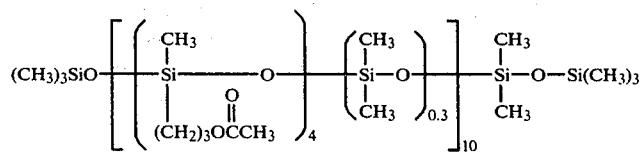

is obtained. After filtering, it is added to 1 liter of methanol to which is added 10 g. of p-toluene sulfonic acid. Reaction is completed in 16 to 24 hours at room temperature and, after neutralizing the catalyst with alcoholic KOH, the volatiles are evaporated under vacuum at room temperature. The residue is dissolved in acetone and filtered to remove the acid salt. Evaporation of the acetone yields:

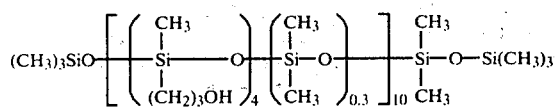

EXAMPLE III

A sample of the product of Example I is placed in a polypropylene mold and heated to 110° C. for 30 minutes to form a contact lens. The lens was placed in water for 24 hours during which time 15 wt.% water is absorbed.

EXAMPLE IV

A sample 35 g. of the product of Example I was mixed with 80 g. of cyclohexane, cooled to 5°-10° C. and 2 g. triethylamine. While maintaining the mixture at 5°-10° C. and agitating, 1.9 g. of methacrylylchloride was slowly added. Reaction was complete within several minutes and the mixture was then filtered and vacuum evaporated to obtain:

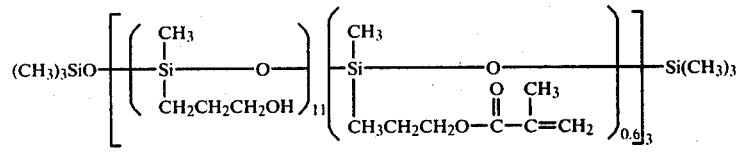

Ten parts by weight of the partial ester thus formed was mixed with 10 parts by weight of 2-hydroxyethylmethylmethacrylate (HEMA) and 0.04 part by weight of tertiary butylperoctoate. The mixture was poured into polypropylene contact lens molds and cured by placing the molds in an air circulating and slowly raising the temperature to 100° C. and holding that temperature for 2 hours. The resulting lenses were a clear copolymer. The cast lenses were hydrated by immersing for 2 days in physiological saline and equilibrium was reached when the lenses had absorbed 20 wt.% water. The hydrated lenses were clear, transparent, flexible, hydrophilic and suitable for use as contact lenses.

EXAMPLE V

Six parts by weight of the partial ester of Example IV was mixed with 14 parts by weight of G-MEMA, 0.04 part by weight of tertiary butylperoctoate and 0.04 part by weight of benzoin methyl ether. The mixture as placed in polypropylene molds, exposed to ultraviolet radiation for 30 minutes and then placed in a circulating air oven, which was slowly heated to 90° C. After 2 hours the cured lenses were cooled to room temperature and removed from the molds. The lenses were clear and absorbed about 40% by weight water after hydration.

EXAMPLE VI

Ten parts by weight of the partial ester of Example IV were mixed with 10 parts by weight G-MEMA, 0.04 part by weight of tertiary butylperoctoate and 0.04 part by weight benzoin methyl ether. The mixture was used to fill polypropylene contact lens molds, exposed to U.V. light for 30 minutes and then placed in an air circulating oven. After slowly raising the oven temperature, the oven was maintained at 70° C. for $1\frac{1}{2}$ hours and then raised to 110° C. for another $1\frac{1}{2}$ hours. The cured lenses were removed from the molds, after cooling to room temperature. They were clear before and after hydration in physiological saline solution. After about two days, equilibrium in the saline solution was reached and the lenses had a water content of about 25% by weight.

EXAMPLE VII

One mole (640 g) of 1,3,5,7-tetra(1-acetoxypropyl)cyclotetramethylsiloxane and one mole (352 g) of 1,7-dichlorooctamethyltetrasilane were reacted following the procedure of Example II.

The purified product had the formula:

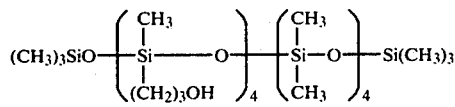

The purified compound was hydrophilic and compatible with both HEMA and G-MEMA.

What is claimed is:

1. A solid polymer comprising a polymerization product of a hydrophilic siloxane having the formula:

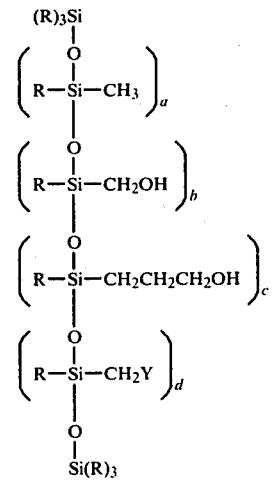

wherein R is an alkyl having 1 to 3 carbons, $a+b+c+d=e$, $b=0$ to e, $c=0$ to e, $b+c>1$, $d=0$ to 5, $e=1$ to 100, and Y is an organic group containing at least one $>C=C<$.

2. A polymer comprising a free radical polymerization product of the hydrophilic siloxane of claim 1, wherein d is 1 to 5, and a monomer selected from the group consisting of 2-hydroxyethylmethacrylate, 3-methoxy-2-hydroxypropylmethacrylate, methylmethacrylate, methylacrylate, N-vinylpyrrolidone and mixtures thereof.

3. A polymer of claim 2 wherein the monomer is 2-hydroxyethylmethacrylate.

4. A polymer of claim 2 wherein the monomer is 3-methoxy-hydroxypropylmethacrylate.

5. A soft contact lens having a water content of at least 20% by weight comprising a polymer of claim 1.

6. A soft contact lens having a water content of at least 20% by weight comprising a polymer of claim 2.

7. The soft contact lens of claim 6 wherein the monomer is 2-hydroxyethylmethacrylate.

8. The soft contact lens of claim 6 wherein the monomer is 3-methoxy-2-hydroxypropylmethacrylate.

* * * * *

UNITED STATES PATENT AND TRADEMARK OFFICE
CERTIFICATE OF CORRECTION

PATENT NO. : 4,261,875

DATED : April 14, 1981

INVENTOR(S) : Albert R. LeBoeuf

It is certified that error appears in the above-identified patent and that said Letters Patent are hereby corrected as shown below:

In column 2, line 23, insert "a+b+c+d=e" before a=e-(b+c+d).

Signed and Sealed this

Fourth Day of August 1981

[SEAL]

Attest:

GERALD J. MOSSINGHOFF

Attesting Officer

Commissioner of Patents and Trademarks